United States Patent
Ofir et al.

(10) Patent No.: US 9,961,562 B2
(45) Date of Patent: May 1, 2018

(54) SYSTEM AND METHOD FOR EXTENDING COVERAGE OF A COMMUNICATION NETWORK

(71) Applicant: MOTOROLA SOLUTIONS, INC., Schaumburg (IL)

(72) Inventors: Gabi Ofir, Reshod Letzion (IL); Rony Gotman, Tel Aviv-Yaffo (IL); Baruh Hason, Tel Aviv-Yaffo (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 117 days.

(21) Appl. No.: 14/739,267

(22) Filed: Jun. 15, 2015

(65) Prior Publication Data

US 2016/0366596 A1  Dec. 15, 2016

(51) Int. Cl.
| | |
|---|---|
| *H04W 16/26* | (2009.01) |
| *H04W 88/08* | (2009.01) |
| *H04W 88/16* | (2009.01) |
| *H04W 88/04* | (2009.01) |

(52) U.S. Cl.
CPC ......... *H04W 16/26* (2013.01); *H04W 88/04* (2013.01); *H04W 88/08* (2013.01); *H04W 88/16* (2013.01)

(58) Field of Classification Search
None
See application file for complete search history.

(56) References Cited

U.S. PATENT DOCUMENTS

| | | | | |
|---|---|---|---|---|
| 7,813,451 | B2 * | 10/2010 | Binder | H04B 7/15542 307/424 |
| 2007/0253444 | A1 * | 11/2007 | Poyhonen | H04L 12/14 370/466 |
| 2008/0089226 | A1 * | 4/2008 | Konuma | H04L 49/351 370/219 |
| 2008/0285500 | A1 * | 11/2008 | Zhang | H04B 7/15507 370/315 |

(Continued)

OTHER PUBLICATIONS

Advanced LTE, "3GPP TR 36.300," technical specification, vol. 9.0.0 (Mar. 2010) pp. 1-34, release 9, 3GPP Organizational Partners.

(Continued)

*Primary Examiner* — Hicham Foud
(74) *Attorney, Agent, or Firm* — Michael Best & Friedrich LLP

(57) ABSTRACT

Systems and methods for extending coverage of a communication network. In one embodiment, a system includes a first base station configured to communicate with a first mobile communication device and to generate a core interface message. The system also includes a second mobile communication device and an application level server. The second mobile communication device is connected to the first base station and is configured to obtain the core interface message from the first base station, generate a message including the core interface message in an application layer of the message, address the message to the application level server, and transmit the message to the application level server. The application level server is configured to receive the message, extract the core interface message from the message, and transfer the core interface message to a network core to emulate an interface between the first base station and the network core.

16 Claims, 6 Drawing Sheets

(56) References Cited

U.S. PATENT DOCUMENTS

| | | | |
|---|---|---|---|
| 2013/0010685 A1* | 1/2013 | Kim | H03M 13/271 370/315 |
| 2013/0250968 A1* | 9/2013 | Zhou | H04L 61/2007 370/431 |
| 2014/0064158 A1* | 3/2014 | Timus | H04W 36/30 370/279 |
| 2014/0146753 A1* | 5/2014 | Bergstrom | H04W 48/18 370/329 |
| 2014/0148213 A1* | 5/2014 | Tinnakornsrisuphap | H04W 16/08 455/522 |
| 2014/0233529 A1* | 8/2014 | Prakash | H04W 36/0022 370/331 |
| 2015/0119097 A1* | 4/2015 | Park | H04W 52/04 455/522 |
| 2015/0296424 A1* | 10/2015 | Xu | H04W 36/0033 370/331 |
| 2016/0353359 A1* | 12/2016 | Lin | H04L 12/4633 |

OTHER PUBLICATIONS

Advanced LTE, "3GPP TR 36.806," technical specification, vol. 12.5.0 (Mar. 2015) pp. 1-2 and 35-43, release 12, 3GPP Organizational Partners.

* cited by examiner

SYSTEM AND METHOD FOR EXTENDING COVERAGE OF A COMMUNICATION NETWORK

BACKGROUND OF THE INVENTION

Mobile communication devices in a communication network, such as a long term evolution (LTE) network, are served by a base station. For example, within a long term evolution network, mobile communication devices are served by an evolved node (eNodeB or eNB). The evolved node communicates with a network core, such as an evolved packet core (EPC), and manages communication between the network core and the mobile communication devices.

A base station is associated with a coverage area and services mobile communication devices located within the coverage area. When a mobile communication device is located outside of the coverage area of the base station, the mobile communication device cannot communicate with the base station, and, by extension, the mobile communication device therefore cannot communicate with the network core. To allow the mobile communication device located outside of the coverage area of the base station to communicate with the network core, an additional base station may be added to the communication network that communicates with the network core. Such an addition, however, generally requires hardware and software changes to the infrastructure of the existing communication network. Similarly, a relay base station may be added to the communication network. The relay base station communicates with original base station and the mobile communication device located outside of the coverage area of the original base station. This configuration also generally requires hardware and software additions to the infrastructure of the communication network and requires the addition of customized hardware (i.e., the relay base station).

Accordingly, there is a need for systems and methods for extending the coverage of a communication network.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
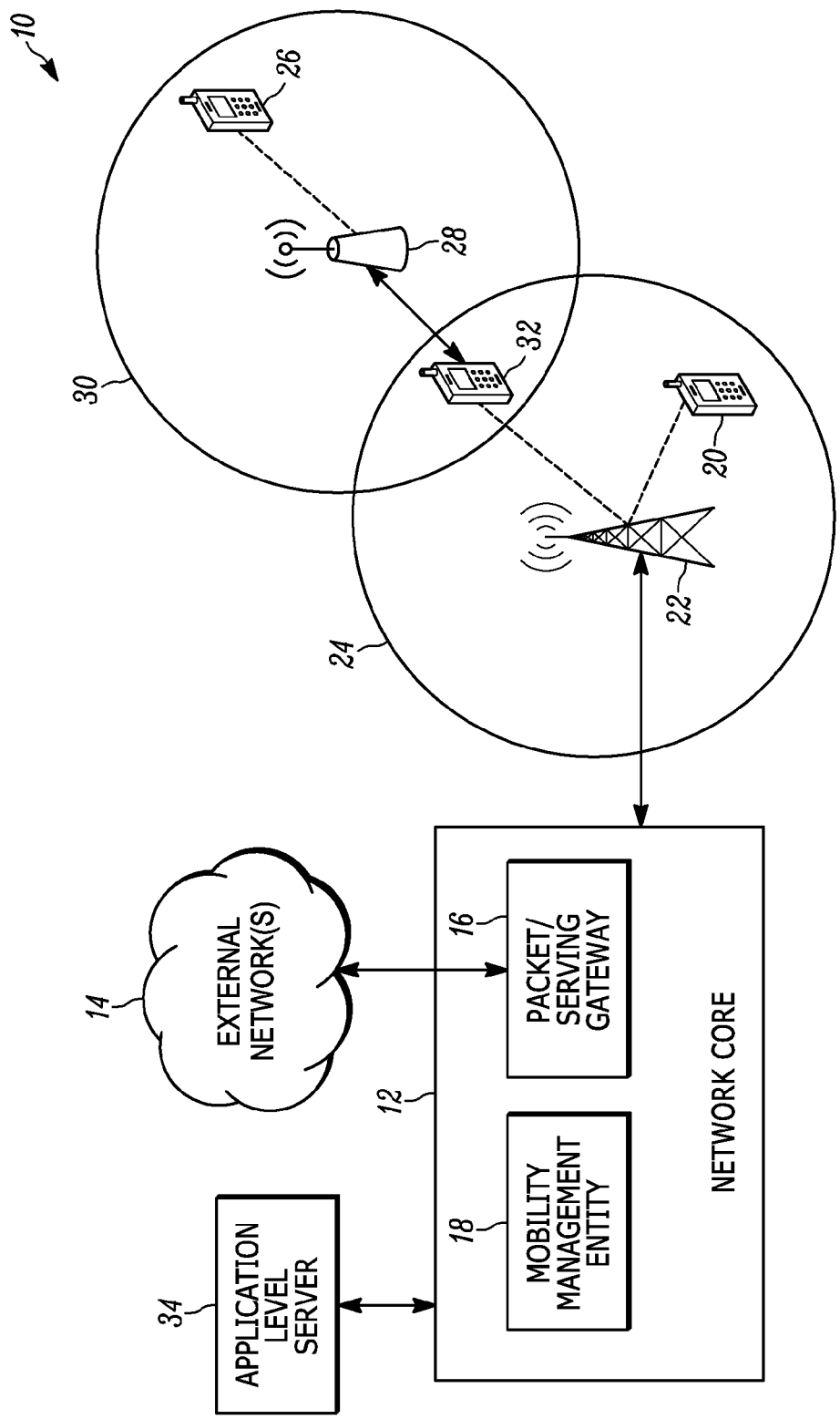
FIG. 1 is a block diagram of a communication network including a nomadic cell in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments of the invention include a system for extending coverage of a communication network. In one embodiment, the system includes a first base station, having a first coverage area, the first base station configured to communicate with a first mobile communication device when the first mobile communication device is located within the first coverage area. The first base station is also configured to generate a core interface message. The system also includes a second mobile communication device and an application level server. The second mobile communication device is connected to the first base station, such as over a back-to-back-connection. The second mobile communication device is configured to obtain the core interface message from the first base station, generate a message including the core interface message in an application layer of the message, address the message to the application level server, and transmit the message to the application level server through a second base station. The application level server is configured to receive the message, extract the core interface message from the application layer of the message, and transfer the core interface message to a network core to emulate an interface between the first base station and the network core.

FIG. 1 is a block diagram of a communication network 10. The communication network 10 illustrated in FIG. 1 operates accordingly to the long term evolution (LTE) specification. However, in other embodiments, the network operates using other specifications or protocols.

The communication network 10 includes a network core 12. The network core 12 manages communications between mobile communication devices and external networks 14, such as the Internet and other private and public networks. In particular, within the long term evolution specification, the network core 12 includes an evolved packet core (EPC) that includes a packet/serving gateway 16 and mobility management entity 18.

As illustrated in FIG. 1, a mobile communication device 20 communicates with the network core 12 through a base station 22. The mobile communication device 20 may be, for example, a smart phone, a tablet computer, a personal digital assistant (PDA), or other device that includes or can be connected to a network modem or components to enable wireless network communications (such as a processor, memory, amplifier, antenna, etc.). The mobile communication device 20 includes software stored therein for execution by a processor and a non-volatile memory or other memory location for storing a subscription profile (i.e., authentication data and network profile data). The non-volatile memory may be located on a universal integrated circuit card (UICC) in the mobile communication device 20.

The mobile communication device 20 communicates with the base station 22 over a wireless communication link. Within the long term evolution specification, the base station 22 is an evolved node (eNodeB or eNB). As illustrated in FIG. 1, the base station 22 has a coverage area 24 that includes the mobile communication device 20. Other mobile communication devices located with the coverage area 24 may also communicate with the base station 22.

The base station 22 also communicates with the network core 12 over a core interface to exchange messages (i.e., data packets) between the mobile communication device 20 and the network core 12. In some embodiments, the base station 22 is directly connected to the network core 12 over a wired or wireless connection. Within a long term evolution network, the core interface between the base station 22 and the network core 12 is referred to as an S1 interface and message transmitted between the base station 22 and the network core 12 are referred to as S1 messages.

The base station 22 uses the core interface to transmit core interface messages to the network core 12 and receive core interface messages from the network core 12. For example, when the base station 22 receives user data (e.g., a user message) from the mobile communication device 20, the base station 22 generates a data core interface message (e.g., an S1-user plane message). The data core interface message may include the user data and an interface header (e.g., an S1 interface header). Alternatively, the base station 22 may generate a control core interface message (e.g., an S1-control plane message). The control core interface message may include control signaling (e.g., generated by the base station 28, the mobile communication device 20, or a combination thereof) and an interface header (e.g., an S1 interface header). The base station 22 may transmit data core interface messages (e.g., S1-user plane messages) to the packet/serving gateway 16 included in the network core 12 and may transmit control core interface messages (e.g., S1-control plane messages) to the mobility management entity 18 included in the network core 12.

Accordingly, upon initialization of base station 22, the base station 22 establishes the core interface with the network core 12, which allows the base station 22 to transmits core interface messages (i.e., data core interface messages and control core interface messages) to the network core 12 to service mobile communication devices included in the coverage area 24 of the base station 22.

As illustrated in FIG. 1, an additional mobile communication device 26 is located outside of the coverage area 24 of the base station 22. Therefore, the additional mobile communication device 26 cannot communicate with the base station 22, which provides access to the network core 12. To extend the coverage of the communication network 10 to allow the additional mobile communication device 26 to communicate with the network core 12, the communication network 10 includes a nomadic base station 28. In some embodiments, the nomadic base station 28 may be identical or substantially similar to the base station 22. However, it will be appreciated that the nomadic base station 28 can alternatively differ from the base station 22. As illustrated in FIG. 1, the nomadic base station 28 provides a coverage area 30 that includes the additional mobile communication device 26. A portion of the coverage area 30 of the nomadic base station 28 overlaps with the coverage area 24 of the base station 22. It should be understood that in some embodiments more than one mobile communication device is located within the coverage area 30 of the nomadic base station 28 and, therefore, more than one mobile communication device communicates with the nomadic base station 28.

A nomadic mobile communication device 32 is connected (e.g., using a back-to-back connection) to the nomadic base station 28 to form a nomadic cell. In some embodiments, the nomadic mobile communication device 32 is connected to the nomadic base station 28 using a wired or wireless Ethernet connection. As illustrated in FIG. 1, the nomadic mobile communication device 32 is positioned within the coverage area 24 of the base station 22 and within the coverage area 30 of the nomadic base station 28 (e.g., within the portion of the coverage area 24 overlapping with the coverage area 30). In some embodiments, the nomadic mobile communication device 32 may be identical or substantially similar to the mobile communication device 20 or the additional mobile communication device 26. Alternatively, the nomadic mobile communication device 32 may differ from the mobile communication device 20 or the additional mobile communication device 26 in other ways. Also, in some embodiments, the nomadic communication device 32 is usable by a subscriber. However, in some embodiments, the nomadic mobile communication device 32 is used solely to transmit messages from the additional mobile communication device 26 as described below and is not used by a subscriber.

As described below, the nomadic base station 28 receives a message (e.g., a data packet) from the additional mobile communication device 26 and generates a first core interface message (e.g., an S1-user plane message or an S1-control plane message), as described above for the base station 22, with unique control signaling for the nomadic base station 28. However, because the nomadic base station 28 is not directly connected to the network core 12 like the base station 22, the nomadic base station 28 uses a virtual core interface to communicate with the network core 12. For example, as described in more detail below, the nomadic mobile communication device 32 connected to the nomadic base station 28 obtains the first core interface message and transmits the first core interface message within a shell message (e.g., as user data in an application layer of the shell message) to the base station 22. The base station 22 generates a second core interface message (e.g., an S1-user plane message) as described above, which includes an interface header (e.g., with unique control signaling for the base station 22) and the shell message. The base station 22 then transmits the second core interface message to the network core 12.

To process the second core interface, the communication network 10 includes an application level server 34. The application level server 34 may be included as part of the network core 12 or may be separate from the network core 12. However, in some embodiments, the application level server 34 may reside on the same server as the network core 12 (e.g., for security purposes). The application level server 34 emulates a server and includes a gateway that allows the application level server 34 to transfer and receive data to and from the network core 12 (e.g., the packet/serving gateway 16 and the mobility management entity 18). Accordingly, as described in more detail below, the application level server 34 receives the shell message included in the second core interface message transmitted by the base station 22 and extracts the first core interface message from the shell message. The application level server 34 then transfers the extracted first core interface message to the network core 12 (e.g., the packet/serving gateway 16 or the mobility management entity 18) as if the first core interface message was directly transmitted by the nomadic base station 28 over a core interface (e.g., an S1 interface) with the network core 12. Accordingly, the application level server 34 establishes an application-level link between the nomadic base station 28 and the network core 12. Thus, to the network core 12, the nomadic base station 28 appears as a directly connected base station like the base station 22.

Thus, when the nomadic base station 28 is added to the communication network 10, the nomadic base station 28 is initialized to establish the virtual core interface (e.g., S1 interface) with the network core 12 through the application level server 34. Thereafter, the nomadic base station 28 operates similar to the base station 22 to service mobile communication devices located within the coverage area 30 of the nomadic base station 28.

Figure 2:
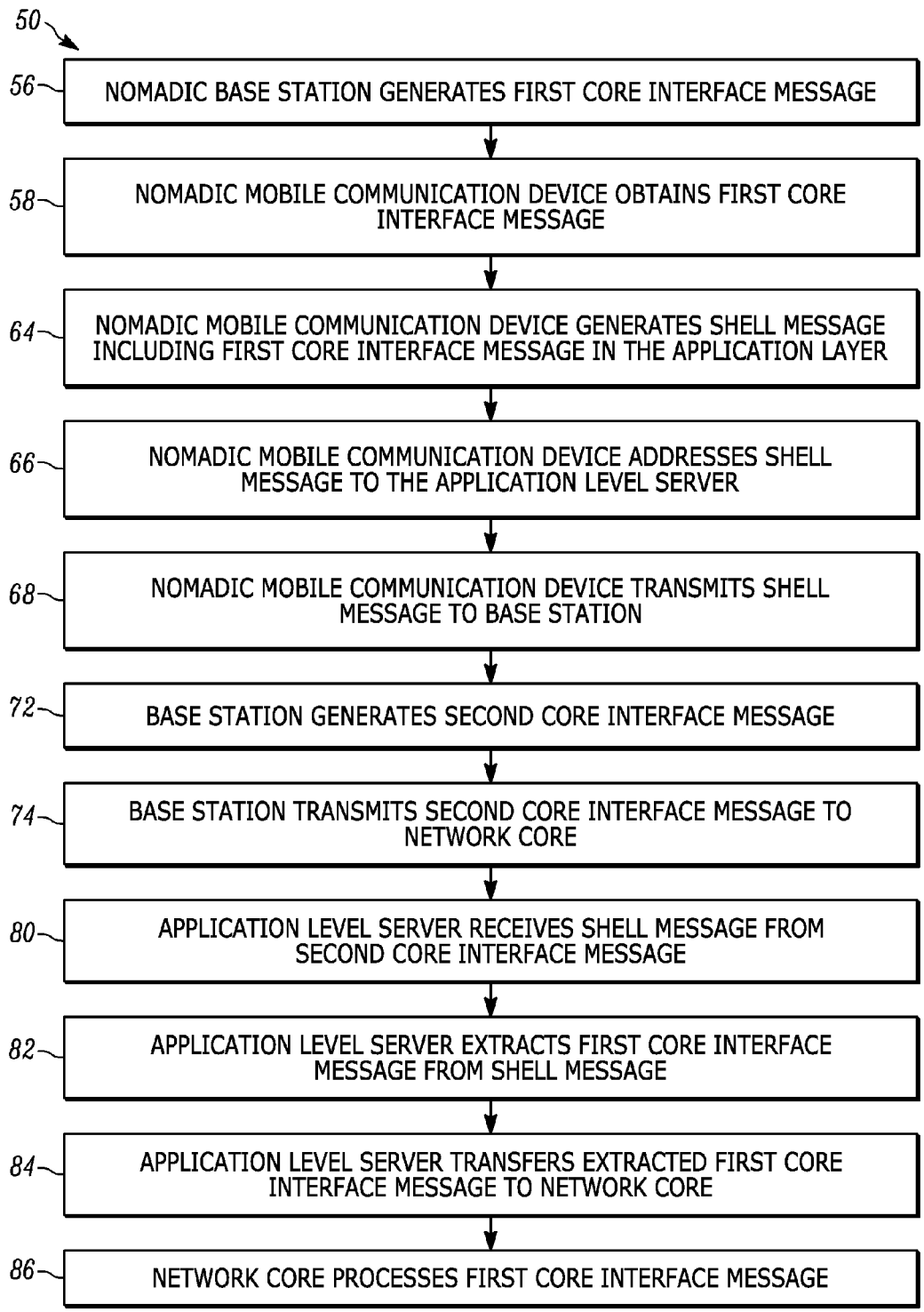
FIG. 2 is a flowchart illustrating a method of transmitting a message from a nomadic base station to a network core included in the communication network of FIG. 1 in accordance with some embodiments.
Figure 3:
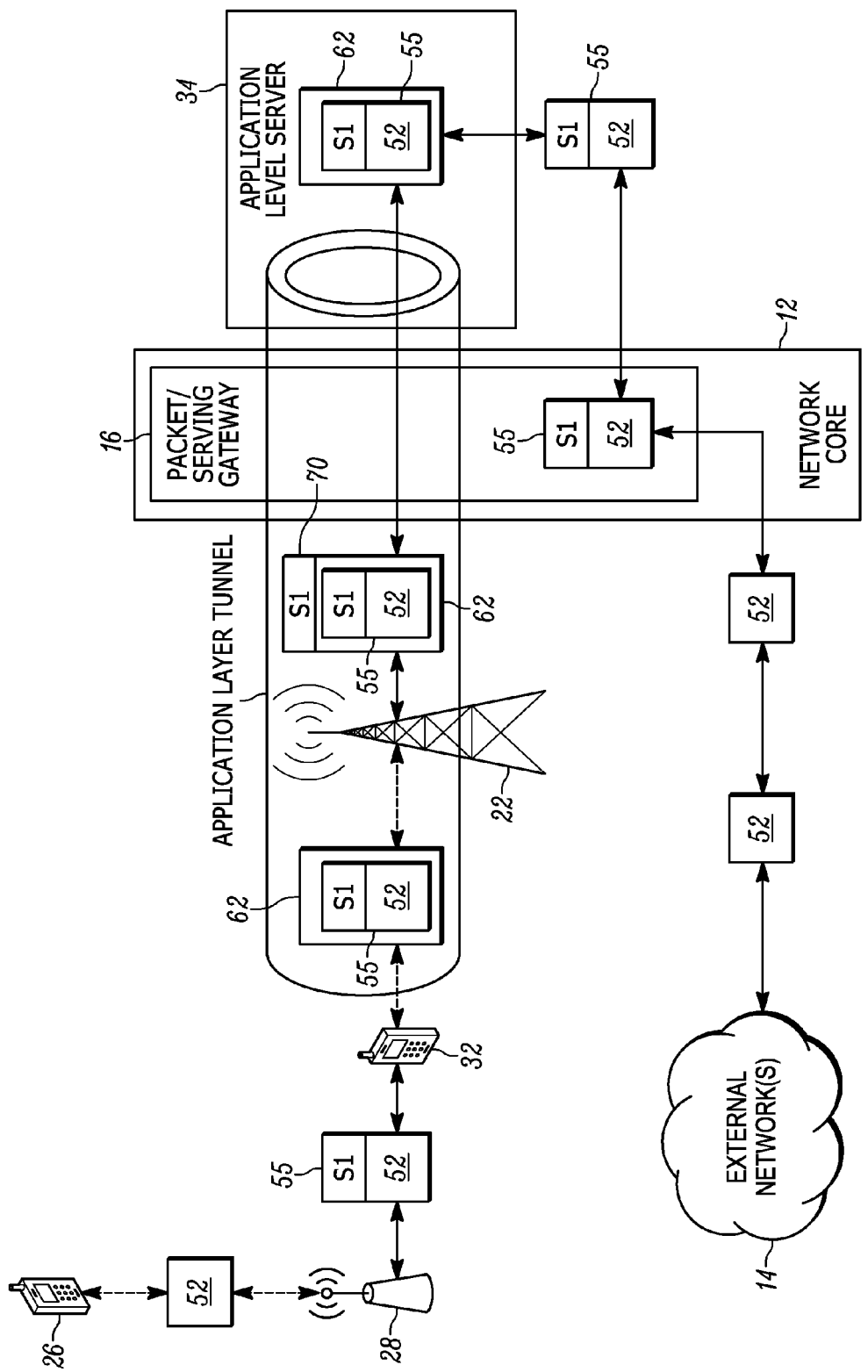
FIG. 3 is a block diagram illustrating transmission of an S1-user plane message using the communication network of FIG. 1 in accordance with some embodiments.
Figure 4:
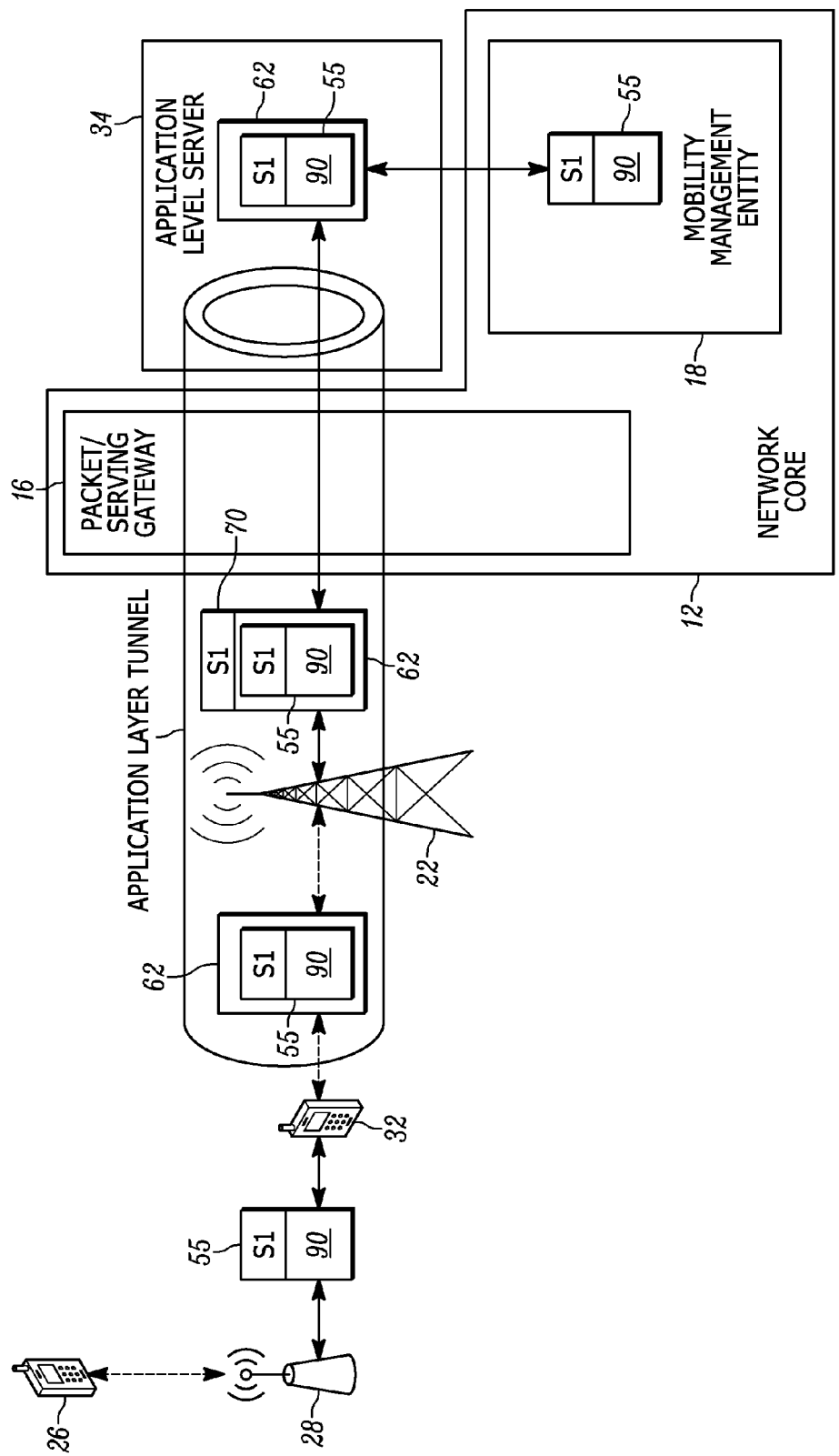
FIG. 4 is a block diagram illustrating transmission of an S1-control plane message using the communication network of FIG. 1 in accordance with some embodiments.

For example, FIG. 2 is a flowchart illustrating a method 50 of transmitting a message (e.g., an S1-user plane message or an S1-control plane message) from the nomadic base station 28 to the network core 12. FIGS. 3 and 4 also illustrate transmission of a message according to the method 50. In particular, FIG. 3 illustrates transmission of a user message (e.g., an S1-user plane message) according to the method 50 within a long term evolution communication network, and FIG. 4 illustrates transmission of a control message (e.g., an S1-control plane message) according to the method 50 within a long term evolution communication network. As illustrated in FIGS. 2 and 3, when the additional mobile communication device 26 transmits a user message 52 (e.g., application data transmitted using an internet protocol interface), the nomadic base station 28 receives the user message 52 and generates a first core interface message 55 (e.g., an S1-user plane message) as described above (at block 56). It should be understood that in some embodiments, the nomadic base station 28 divides the user message 52 into multiple sub-messages that are transmitted in multiple core interface messages.

The nomadic mobile communication device 32 obtains the first core interface message 55 from the nomadic base station 28 (at block 58). In some embodiments, the nomadic base station 28 transmits the first core interface message 55 to the nomadic mobile communication device 32. In other embodiments, the nomadic mobile communication device 32 polls the nomadic base station 28 for core interface messages and pulls the first core interface message 55 from the nomadic base station 28.

As illustrated in FIG. 3, the nomadic mobile communication device 32 generates a message 62 that includes the first core interface message 55 in an application layer of the message 62 (at block 64). The message 62 acts as a cover or shell for the first core interface message 55. Therefore, the message 62 may be referred to within the present application as the shell message 62.

The nomadic mobile communication device 32 addresses the shell message 62 to the application level server 34 (e.g., an internet protocol address of the application level server 34) (at block 66) and transmits the shell message 62 to the base station 22 (at block 68). The base station 22 generates a second core interface message 70 (e.g., an S1-user plane message) as described above (at block 72). The second core interface message 70 includes an interface header (e.g., including unique control signaling for the base station 22) and the shell message 62. The base station 22 then transmits the second core interface message 70 to the network core 12 (at block 74). Accordingly, the nomadic mobile communication device 32 transmits the first core interface message 55 by tunneling the first core interface message 55 within the uplink traffic payload (i.e., an application-level traffic pipe) of the nomadic mobile communication device 32. In particular, the shell message 62 transmitted by the nomadic mobile communication device 32 acts as an application-level link between the nomadic base station 28 and the network core 12 over an existing communication channel (i.e., the core interface between the base station 22 and the network core 12).

As illustrated in FIG. 3, the network core 12 receives the second core interface message 70 and processes the second core interface message 70. In particular, the packet/serving gateway 16 extracts the shell message 62 from the second core interface message 70 (e.g., as the packet/serving gateway processes any core interface message including user data addressed to a particular application) and routes the shell message 62 to the application level server 34 (at block 80). The application level server 34 extracts the first core interface message 55 from the application layer of the shell message 62 (at block 82). The application level server 34 then transfers the first core interface message 55 to one or more components of the network core 12 as an emulation of a core interface message received directly from the nomadic base station 28 (at block 84). Accordingly, the network core 12 receives and processes the first core interface message 55 as if the first core interface message 55 were received directly from the nomadic base station 28 (at block 86). In particular, for the user message 52 (see FIG. 3), the application level server 34 transmits the first core interface message 55 (e.g., an S1-user plane message) to the packet/serving gateway 16, which routes the user message 52 to the appropriate external network 14.

As illustrated in FIG. 4, the nomadic base station 28 may also transmit a first core interface message 55 that includes control signaling 90 (e.g., an S1-control plane message). The control signaling 90 can be generated by the nomadic base station 28 independent of or based on data received from the additional mobile communication device 26. In this situation, when the application level server 34 extracts the first core interface message 55 from the application layer of the shell message 62 (at block 82), the application level server 34 transfers the first core interface message 55 (e.g., an S1-control plane message) to the network core 12 as an emulation of a core interface message received directly from the nomadic base station 28 (at block 84) (e.g., by transmitting the first core interface message 55 to the mobility management entity 18 for processing).

Figure 5:
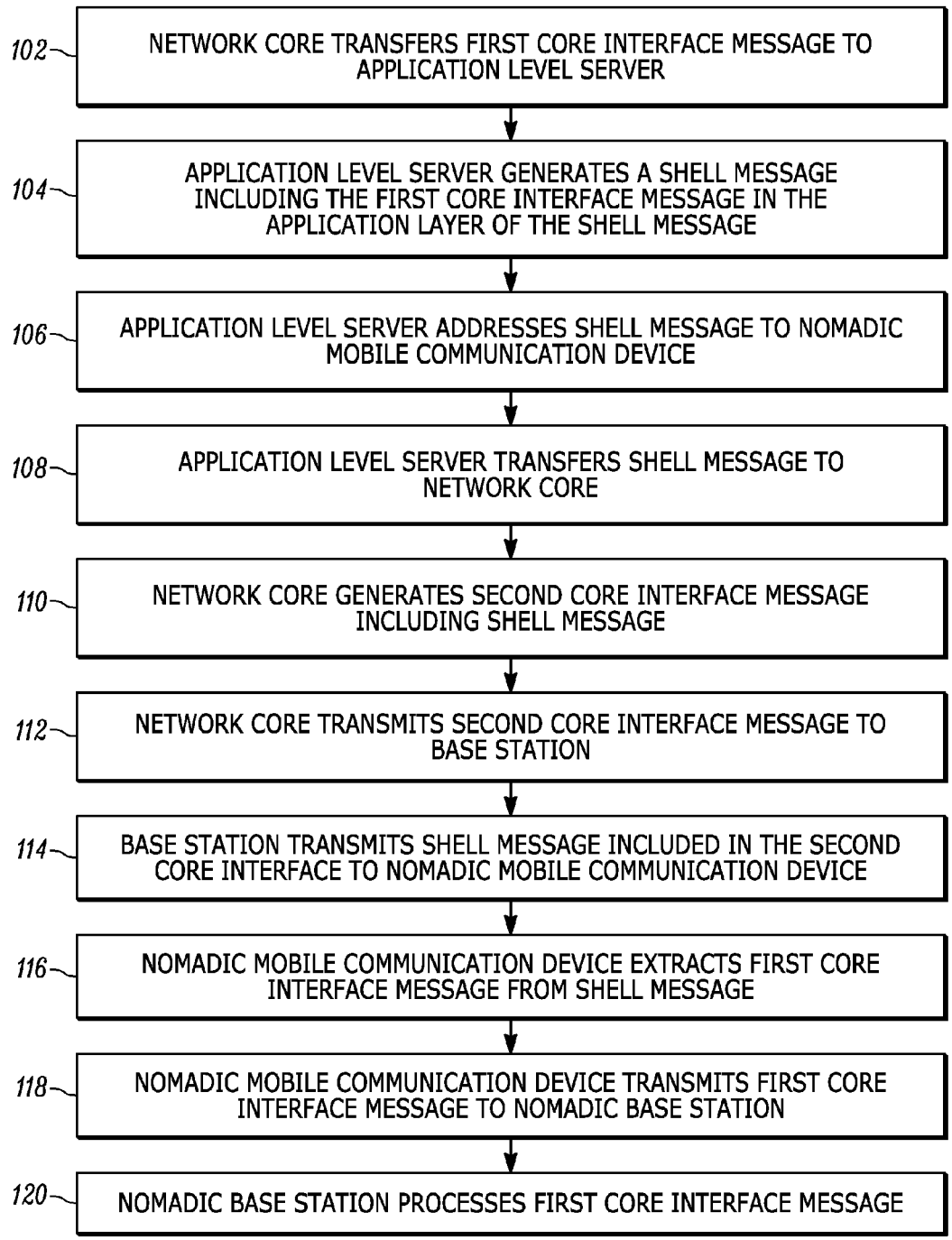
FIG. 5 is a flowchart illustrating a method of transmitting a message from a network core to a nomadic base station included in the communication network of FIG. 1 in accordance with some embodiments.

Messages from the network core 12 to the nomadic base station 28 are transmitted using the same virtual core interface. For example, FIG. 5 is a flowchart illustrating a method 100 of transmitting a message (e.g., an S1-user plane message or an S1-control plane message) from the network core 12 to the nomadic base station 28. As illustrated in FIG. 5, the network core 12 (e.g., the packet/serving gateway 16 or the mobility management entity 18) generates a first core interface message and transfers the first core interface message to the application level server 34 (at block 102).

The application level server 34 generates a shell message that includes the first core interface message in the application layer (at block 104). The application level server 34 addresses the shell message to the nomadic mobile communication device 32 (at block 106) and transmits the shell message to the network core 12 (e.g., to the packet/serving gateway 16) (at block 108). The network core 12 generates a second core interface message (e.g., an S1-user plane message) including the shell message (at block 110) and transmits the second core interface message to the base station 22 (at block 112).

The base station 22 transmits the shell message included in the second core interface message to the nomadic mobile communication device 32 (at block 114). The nomadic mobile communication device 32 extracts the first core interface message from the shell message (at block 116) and transmits the first core interface message to the nomadic base station 28 (at block 118). The nomadic base station 28 then process the first core interface message as if the first core interface message were directly received from the network core 12 (at block 120). In particular, when the first core interface message includes a user message (e.g., the first core interface message is an S1-user plane message) the nomadic base station 28 transmits the user message included in the first core interface message to the additional mobile communication device 26. Similarly, if the first core interface message includes control signaling (e.g., the first core interface message is an S1-control plane message), the nomadic base station 28 process the first core interface message accordingly.

Figure 6:
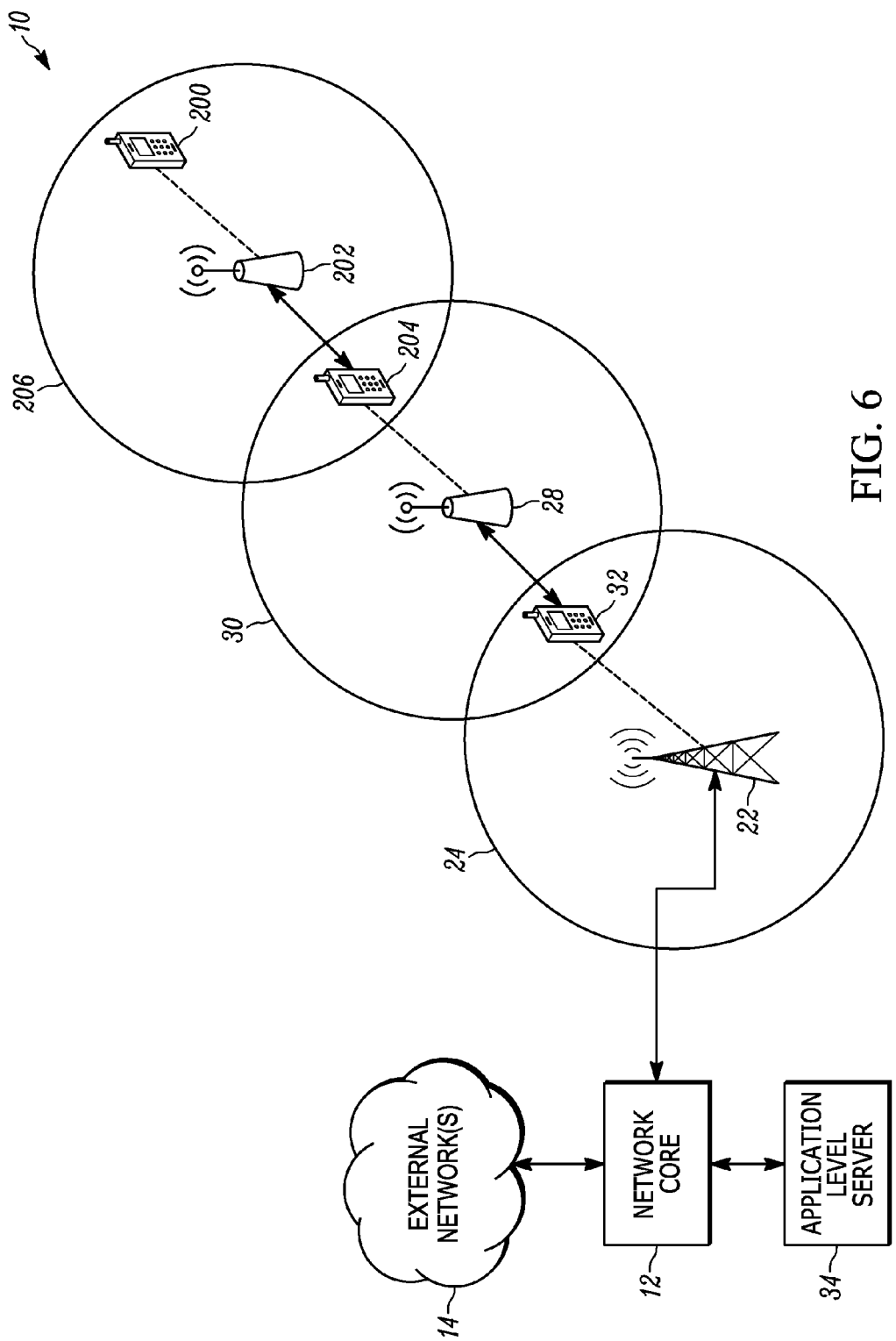
FIG. 6 is a block diagram of a communication network including multiple nomadic cells in accordance with some embodiments.

In some embodiments, multiple nomadic cells may be added to a communication system to further extend coverage. For example, two or more nomadic cells may added to the system 10 to extend the coverage of the system 10 in various directions. Alternatively or in addition, in some embodiments, two or more nomadic cells may be cascaded (e.g., on demand) to further extend the coverage of a communication system. In particular, as illustrated in FIG. 6, the communication network 10 may include an additional mobile communication device 200 that transmits messages to a second nomadic base station 202 connected to a second nomadic mobile communication device 204. The second nomadic mobile communication device 204 is positioned within a coverage area 206 of the second nomadic base station 202 and the coverage area 30 of the nomadic base station 28. The additional mobile communication device 200 is also located within the coverage area 206 of the second nomadic base station 202 but is located outside of the coverage area 30 of the nomadic base station 28.

Upon receiving a message from the additional mobile communication device 200 at the second nomadic base station 202, the second nomadic base station 202 generates a first core interface message (e.g., an S1-user plane message or an S1-user control message) as described above. The second nomadic mobile communication device 204 obtains the first core interface message and generates a first shell message as described above that includes the first core interface message in the application layer of the first shell message. The second nomadic mobile communication device 204 then transmits the first shell message to the nomadic base station 28.

The nomadic base station 28 receives the first shell message and generates a second core interface message (e.g., an S1-user plane message) that that includes the received first shell message. The nomadic mobile communication device 32 obtains the second core interface message and generates a second shell message that includes the second core interface message in an application layer of the second shell message. The nomadic mobile communication device 32 transmits the second shell message to the base station 22, which generates a third core interface message (e.g., an S1-user plane message) and transmits the third core interface message to the network core 12.

The network core 12 receives the third core interface message and transfers the second shell message included in the third core interface message to the application level server 34. The application level server 34 extracts the second core interface message from the second shell message and transfers the second core interface message to the network core 12 as described above. Upon receiving the second core interface message, the network core 12 transfers the first shell message included in the second core interface message to the application level server 34. The application level server 34 extracts the first core interface message from the first shell message and transfers the first core interface message to the network core 12. Accordingly, the network core 12 processes the first core interface message as if it were received directly from the second nomadic base station 202 even though the first core interface message was received through a virtual core interface established between the network core 12 and the second nomadic base station 202 and a virtual core interface established between the network core 12 and the nomadic base station 28. Messages transmitted from the network core 12 to the additional mobile communication device 200 are transmitted in a similar manner in the opposite direction.

It should be understood that although only a single mobile communication device is illustrated in some of the coverage areas illustrated in FIGS. 1 and 6, each coverage area associated with a base station may include more than one mobile communication device that communicates with the base station. Also, in some embodiments, a single nomadic mobile communication device may be used as described above to convey messages from multiple mobile communication devices communicating with the nomadic base station connected to the nomadic mobile communication device. However, in some embodiments, multiple nomadic mobile communication devices may be connected to a single nomadic base station. In this configuration, each nomadic mobile communication device may be paired with one or more mobile communication devices communicating with a nomadic base station.

Using a nomadic cell (e.g., the nomadic mobile communication device 32 and the nomadic base station 28) described above extends coverage of a communication system with few, if any, changes to the existing infrastructure of the communication system. Also, the nomadic cell relies on standard equipment with software enhancements (e.g., application level software enhancements to user equipment included in the nomadic cell and the network core 12 providing the application level server 34) independent of infrastructure vendors. Thus, the nomadic cell adds modularity to an existing infrastructure of a communication system by functioning as a relay base station without the need for specialized equipment.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for extending coverage of a communication network, the system comprising:
   a first base station having a first coverage area, the first base station configured to communicate with a first mobile communication device when the first mobile communication device is located within the first coverage area and to generate a first core interface message;
   a second base station having a second coverage area having a portion overlapping the first coverage area;
   a second mobile communication device positioned within the portion of the second coverage area that overlaps the first coverage area, connected to the first base station and in wireless communication with a network core through the second base station, and configured to obtain the first core interface message from the first base station; and
   an application level server,
   wherein the second mobile communication device is configured to
   generate a first shell message including the first core interface message in an application layer of the first shell message,
   address the first shell message to the application level server, and
   transmit the first shell message to the application level server through the second base station; and
   wherein the application level server is configured to
   receive the first shell message from the network core,
   extract the first core interface message from the application layer of the first shell message, and
   transfer the first core interface message to the network core to emulate a virtual core interface between the first base station and the network core.

2. The system of claim 1, wherein the second mobile communication device is connected to the first base station using a back-to-back connection.

3. The system of claim 1, wherein the second mobile communication device is connected to the first base station using an Ethernet connection.

4. The system of claim 1, wherein the second base station is configured to
   generate a second core interface message including the first shell message and to transmit the second core interface message to a packet/serving gateway included in the network core, and
   wherein the packet/serving gateway is configured to transfer the first shell message included in the second core interface message to the application level server.

5. The system of claim 4, wherein the application level server is further configured to
   receive a third core interface message from the network core,
   to generate a second shell message including the third core interface message in an application layer of the second shell message, and
   to transfer the second shell message to the network core.

6. The system of claim 5, wherein the network core is configured to
generate a fourth core interface message including the second shell message and transmit the fourth core interface message to the second base station, wherein the second base station is configured to
transmit the second shell message included in the fourth core interface message to the second mobile communication device, and
wherein the second mobile communication device is configured to provide the third core interface message included in the second shell message to the first base station.

7. The system of claim 4, further comprising a third base station and a third mobile communication device connected to the third base station, wherein the third base station is configured to generate a third core interface message and wherein the third mobile communication device is configured to obtain the third core interface message, to generate a second shell message including the third core interface message in an application layer of the shell second message, and to transmit the second shell message to the first base station.

8. The system of claim 7, wherein the first base station is further configured to generate a fourth core interface message including the second shell message and wherein the second mobile communication device is further configured to obtain the fourth core interface message, to generate a third shell message including the fourth core interface message in an application layer of the third shell message, to address the third shell message to the application level server, and to transmit the third shell message to the application level server through the second base station.

9. The system of claim 1, wherein the application level server is configured to transfer the first core interface message to the network core by transferring the first core interface message to a packet/serving gateway included in the network core.

10. The system of claim 1, wherein the application level server is configured to transfer the first core interface message to the network core by transferring the first core interface message to a mobility management entity included in the network core.

11. The system of claim 1, wherein the application level server is included in the network core.

12. The system of claim 1, wherein the first base station includes an evolved node.

13. The system of claim 1, wherein the network core includes an evolved packet core.

14. The system of claim 1, wherein the first core interface message includes at least one selected from a group consisting of an S1-user plane message and an S1-control plane message.

15. A method of extending coverage of a communication network, the method comprising:
generating, with a base station having a first coverage area, a first core interface message;
obtaining the first core interface message with a mobile communication device positioned within a portion of the first coverage area overlapping a second coverage area for a second base station, the mobile communication device connected to the base station and in wireless communication with a network core through the second base station;
generating, with the mobile communication device, a first shell message including the first core interface message in an application layer of the message;
addressing, with the mobile communication device, the first shell message to an application level server; and
transmitting, with the mobile communication device, the first shell message to the application level server
receiving, with the application level server, the first shell message from the network core;
extracting, with the application level server, the first core interface message from the application layer of the shell message; and
transferring, with the application level server, the first core interface message to the network core to emulate a virtual core interface between the base station and the network core.

16. The method of claim 15, wherein obtaining the first core interface message with the mobile communication device includes obtaining the first core interface message over a back-to-back connection between the mobile communication device and the base station.

* * * * *